United States Patent [19]

Rasmussen et al.

[11] Patent Number: 5,667,881
[45] Date of Patent: Sep. 16, 1997

[54] INTEGRAL THERMOSET/THERMOPLASTIC COMPOSITE JOINT

[75] Inventors: Perry A. D. Rasmussen; Janis M. Brown, both of Tucson, Ariz.

[73] Assignee: Hughes Missile Systems Company, Los Angeles, Calif.

[21] Appl. No.: 469,341

[22] Filed: Jun. 6, 1995

[51] Int. Cl.⁶ ............................................. B32B 7/00
[52] U.S. Cl. ................. 428/272; 428/273; 428/423.1; 428/473.5; 156/308.2; 264/241
[58] Field of Search ........................... 428/272, 273, 428/423.1, 473.5; 156/308.2; 264/241

[56] References Cited

U.S. PATENT DOCUMENTS

| | | | |
|---|---|---|---|
| 4,938,823 | 7/1990 | Balazek et al. | 156/166 |
| 5,087,514 | 2/1992 | Graefe | 428/315.5 |

*Primary Examiner*—Christopher Raimund
*Attorney, Agent, or Firm*—Charles D. Brown; Wanda Denson-Low

[57] ABSTRACT

A prepreg thermoset sheet, ready to be cured, is molded with a preprocessed thermoplastic part to form an integral thermoset/thermoplastic composite joint. The composite produces a more robust access panel. The thermoplastic part is more damage tolerant and easy to repair. The thermoset part, while more difficult to repair, is cheaper than the thermoplastic part and thus used in those places where damage is not likely to occur. The method of molding the two parts together comprises: (a) providing a first part comprising the thermoset resin and a second part comprising the thermoplastic resin, both resins being partially miscible in each other; and (b) forming an interface between the first and second parts by bringing the parts into mutual contact and heating the parts at a temperature and pressure for a period of time sufficient to promote mutual miscibility prior to forming a network structure in the thermoset resin. The integral thermoplastic/thermoset composite joint produced in accordance with the teachings of the present invention is a unique composite joint, produced by interfacing/co-curing two traditionally incompatible materials into a hybrid structural system. The conditions for forming the hybrid structural system derive from the use of thermoplastic materials and thermoset materials that are at least partially miscible in each other at an elevated temperature.

19 Claims, 1 Drawing Sheet

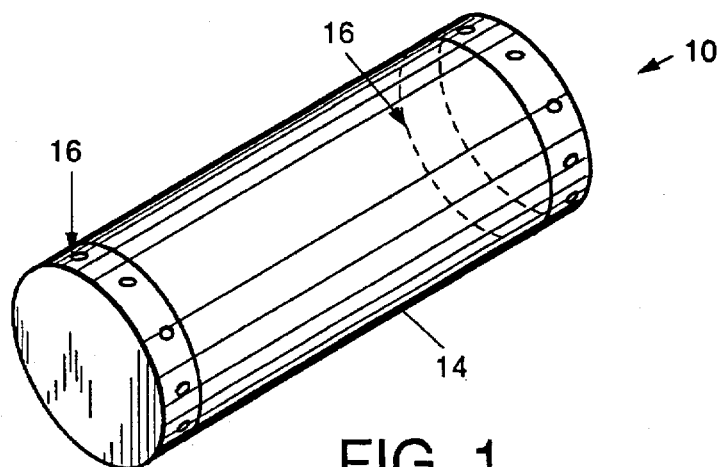
FIG. 1.
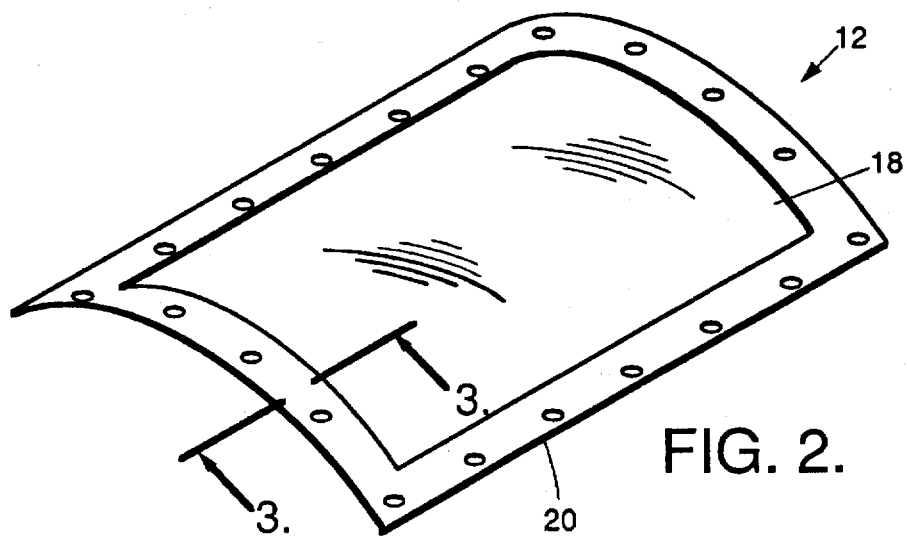
FIG. 2.
FIG. 3.
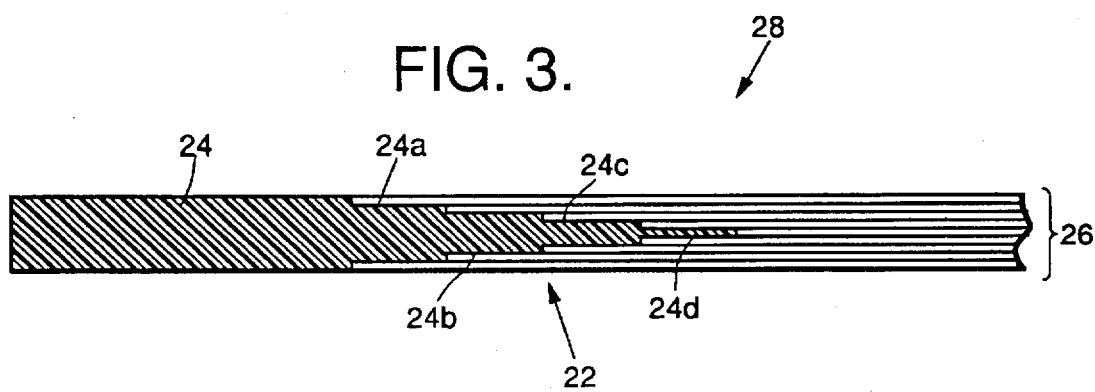

INTEGRAL THERMOSET/THERMOPLASTIC COMPOSITE JOINT

BACKGROUND OF THE INVENTION

1. Field of the Invention

The present invention relates generally to polymeric joints, and, more particularly, to composite joints comprising a thermoset plastic and a thermoplastic polymer.

2. Description of Related Art

Hatch covers, alternately called access panels or fuselage sections, are used for aircraft and missiles to allow access to components for maintenance (battery, predetermined set of flight instructions, fuel pouches, ignition canisters, and the like), for example. These access panels are often fabricated from aluminum sheets. However, aluminum access panels are costly to fabricate because thick flat sheets of aluminum metal are required for machining into a curved panel. Thus, there is a substantial cost of material, much of which is wasted, and machining cost, as well as the expense of tooling. Further, there is the expense of inspecting the aluminum panels to ensure fabrication within a set specification. Finally, the panel must be cleaned and coated to prevent corrosion.

Composite access panels are known in the art, and find use in, for example, jet engine cowling doors. The composite panels are cheaper and lighter than aluminum but are costly to fabricate in that it is difficult to get a satisfactory acceptance/rejection ratio. These composite access panels are comprised of a fiber-filled thermoset prepreg.

Such composite panels, which weigh 40 to 60 percent of the aluminum panels, are preferred, as a one-time molding process can be employed, resulting in lower tooling costs compared to aluminum. However, the thermoset panels use prepreg, which has a shelf life of only several months and requires storage in environmentally-controlled areas, which in turn can add to the cost of using thermoset plastics. Further, the use of time-expired materials causes process problems, leading to unsatisfactory acceptance/rejection ratios, mentioned above. Also, while the thermoset material is relatively inexpensive, it cannot be easily repaired in the event of damage.

Thermoplastic material, which is not presently employed in such uses, is easily repaired, but is costly relative to the thermoset material. Thermoplastics further offer the advantage that they can be reformed and remolded and even welded.

There is a need for a construction for access panels for aircraft that are not costly to fabricate or repair and that do not present process problems with respect to the use of materials with limited shelf life.

SUMMARY OF THE INVENTION

In accordance with the present invention, a thermoset prepreg sheet, ready to be cured, is molded with a preprecessed thermoplastic part to form an integral thermoset/thermoplastic composite joint. The composite produces a more robust access panel. The thermoplastic part is more damage tolerant and easy to repair. The thermoset part, while more difficult to repair, is cheaper than the thermoplastic part and thus used in those places where damage is not likely to occur.

The method of the invention comprises:

(a) providing a first part comprising the thermoset resin and a second part comprising the thermoplastic resin, both resins being partially miscible in each other; and (b) forming an interface between the first and second parts by bringing the parts into mutual contact and heating the parts at a temperature and pressure for a period of time sufficient to promote mutual miscibility prior to forming a network structure in the thermoset resin.

The integral thermoplastic/thermoset composite joint produced in accordance with the teachings of the present invention is a unique composite joint, produced by interfacing/co-curing two traditionally incompatible materials into a hybrid structural system. The conditions for forming the hybrid structural system derive from the use of thermoplastic materials and thermoset materials that are at least partially miscible in each other at an elevated temperature. By "partially miscible" is meant that the two materials are soluble to each other to some extent, but not totally. Thus, dissolution can exist when a suitable thermoplastic resin is brought in contact with an appropriate thermoset resin at a suitable temperature (where the thermoset resin is still liquid) for a suitable time.

The thermoplastic/thermoset (TP/TS) hybrid composite joint design of the present invention allows the selective application of thermoplastic matrix composites in areas where damage tolerance and repairability are desirable. The thermoplastic matrix material has properties that simplify field repair capability and allow weldability at the interfaces for low-cost joining of parts. The TP/TS hybrid composite design also allows maximum use of lower cost thermosets over the majority of the structure, with the more expensive thermoplastics used at the structural interfaces. The joint is designed to transfer load from the thermosetting composite to the thermoplastic composite and provides a lower cost, more reliable hermitic seal than a normal composite-to-metal design.

BRIEF DESCRIPTION OF THE DRAWINGS

FIG. 1 is a perspective view of thermoplastic end rings bonded to a thermoset composite fuselage in accordance with the teachings of the present invention;

FIG. 2 is a perspective view of a thermoplastic frame bonded to a thermoset composite door, forming a curved panel, in accordance with the teachings of the present invention; and FIG. 3 is a cross-sectional view taken along line 3—3 of FIG. 2, depicting a composite joint prepared in accordance with the teachings of the present invention.

DESCRIPTION OF THE PREFERRED EMBODIMENTS

It is known in the art that a thermosetting resin can be co-cured with thermoplastic resin to improve the ductility of a given thermoset resin system through the addition of tougheners to the resin system. These tougheners are soluble (often reactive) thermoplastic or rubbery polymers which are added through dissolution to a compatible thermosetting resin system. The thermoset and thermoplastic resins are combined through melt blending or dissolved in a mutual solvent, blended, and the solvent subsequently stripped off. The conditions for dissolution can exist when a suitable thermoplastic is brought in contact with an appropriate thermoset at a suitable temperature (where the thermoset is still liquid) for a suitable time.

In the present invention, bonding or joining thermoset/thermoplastic materials together is achieved by combining or reacting them in a co-cured operation. During the co-cure process, the migration of the amorphous thermoplastic into the thermoset (or vise-versa) occurs across the interface region while the thermoset is still liquid. Once the cure cycle is complete, the interface region has now become the bond region, forming a structural attachment between the thermoplastic and thermoset composite parts. The interface then becomes a dispersion of one phase in the other. This dispersion is of a gradient nature with the relative ratios of the materials comparable in the middle (line a semi-interpenetrating network) and decreasing as one goes away from the interface until the resin is solely thermoset (TS) or thermoplastic (TP), making a smooth concentration transition from thermosetting matrix to thermoplastic.

The integral thermoset/thermoplastic composite joint is fabricated by:

(a) providing a first part comprising a thermoset resin and a second part comprising a thermoplastic resin, both resins being partially miscible in each other; and (b) forming an interface between the first and second parts by bringing the parts into mutual contact and heating the parts at a temperature and pressure for a period of time sufficient to promote mutual miscibility prior to forming a network structure in the thermoset resin.

The resins are only partially miscible, not totally miscible, in each other. If the resins were totally miscible, the joint strength would be lost. Preferably, the two resins are mutually soluble in the range of about 10 to 60 percent.

Preferred thermoset resins include bismaleimides (BMI) and cyanate esters. Preferred thermoplastic resins include polyetherimides (PEI) or polyethersulfones (PES). Either of the thermoset resins can be used with either of the thermoplastic resins. Other thermoset/thermoplastic resin combinations can be determined by examining the extent of mutual solubility, within the guidelines given above. Such resins that meet the foregoing criteria may also be employed in the practice of the invention. Further, the thermoplastic resin may include chopped fiberglass or chopped graphite fibers. The thermoset resin includes woven fiber.

As an example, a composite prepreg made with a thermosetting resin system is laminated against a pre-formed thermoplastic part. The laminated material is then co-cured at elevated temperature and pressure. During the unique cure cycle, the thermoset resin becomes liquid and through partial miscibility between the liquid thermoset and thermoplastic, a transition region forms between the two resin systems. The transition region is a bonding region, intermediate in composition to the two dissimilar materials. The bonding region behaves much like an adhesively-bonded joint, transferring structural load between the thermosetting composite laminate and the thermoplastic material.

Specifically, the parts are placed in a heated press, autoclave, or oven and sufficient pressure is applied to maintain both parts in mutual contact. The parts are then subjected to a curing cycle, which involves heating the parts either directly to the cure temperature and maintaining at that temperature for a period of time or to an intermediate temperature, maintaining at that temperature for a period of time, and then to the cure temperature. In either case, the parts may be then subjected to a higher, post-cure temperature, maintained at that temperature for a period of time, and then cooled to room temperature. For example, while the BMI resins typically require a post-cure, other thermoset resins do not.

The pressure used throughout the process is in the same range as presently used in the molding of thermoset panels, and is on the order of 100 psi (7.0 Kg/cm$^2$), although somewhat lower or higher pressures may be used.

The cure temperature does not significantly exceed the glass transition temperature ($T_g$) of the thermoplastic resin.

For PEI, the $T_g$ is about 215° C., while for PES, the $T_g$ is about 180° C. The parts are maintained at the cure temperature, under the pressure mentioned above, for a time sufficient to promote mutual solubility of the two resins. The cure time for these resins is typically on the order of about 4 to 24 hours. The cure temperature and cure time are selected to bring the two resins into the mutual solubility regime on a time-temperature plot of the two materials, prior to substantial formation of the molecular network associated with fully cured thermoset resins. Such selection is considered to be routine for the person skilled in this art.

It may be desired to bring the two parts to an elevated temperature that is below the cure temperature, in order to allow longer times for dissociation if the network is formed too quickly at the cure temperature. Such an intermediate temperature is in the range of about 100° to 150° C. The parts are held at the intermediate temperature, under pressure, for a time of about 0.5 to 10 hours.

Subsequent to curing the parts are then heated to a post-cure temperature to fully develop the thermoset network. For BMI and cyanate esters, the post-cure temperature is in the range of about 175° to 250° C. The parts are held at that temperature for a period of time sufficient to completely form the network, typically about 2 to 10 hours. The post-curing may be done without applied pressure; however, preferably, the applied pressure described above is maintained during post-curing The rate of heating is somewhat critical, in that if the rate is too slow or too fast, then phase separation does not occur and the integral joint is not formed. A heating rate of about 2° C. per minute is conveniently employed, although this value may be varied somewhat.

The rate of cooling to room temperature is not overly critical, other than that the joined parts must not be cooled too rapidly, since otherwise debonding may occur. A cooling rate of about 2° C. per minute is conveniently employed, although this value may also be varied somewhat.

The thermoset and thermoplastic parts are joined together using any of the common joints, such as lap, step-lap, scarf, and the like. For example, a conventional step-lap bonded joint is made by combining a pseudo-isotropic thermoset laminate co-cured to a compression molded thermoplastic. The step-lap joint is one of the strongest bond joints that can be produced reliably in a composite co-cure operation. It will be appreciated by those skilled in this art that the bonded scarf joint is theoretically stronger, but the length of the scarf (overlap typically l/t~50/1) is very long (l) in thick (t) laminates and not practical in most composite joint designs.

A variety of composite TS and TP conjoined parts may be fabricated in accordance with the teachings herein. FIGS. 1 and 2 depict a fuselage 10 and curved panel 12, respectively. The fuselage 10 comprises a cylindrical body 14, comprising a thermoset composite, to which end rings 16, comprising a thermoplastic material, are bonded. The curved panel 12 comprises a door portion 18, comprising a thermoset composite, to which a frame member 20, comprising a thermoplastic material, is bonded. The thermoset and thermoplastic parts are bonded, or joined together, as described above.

FIG. 3 depicts an example of a step-lap joint 22 in which a molded thermoplastic part 24 is joined to a thermoset composite prepreg 26. The molded thermoplastic part 24 is provided with a series of steps 24a, 24b, 24c, 24d. Layers of the thermoset prepreg 26 are laid up, butting against the steps 24a, 24b, 24c, 24d, as shown in FIG. 3. The combination 28 is then heated as described above to form the completed integral TS/TP composite joined article. If repair of the combination is required, ultrasonic welded joints could be formed in the main portion of the thermoplastic part 24, outside of the joint region 22.

As an example, the thermoset resin may comprise BMI and the thermoplastic resin may comprise PES. The parts are laminated against each other and heated under the pressure of about 100 psi to the cure temperature about 180° C. at a rate of about 2° C. per minute, held at that temperature for 6 hours, then heated to a post-cure temperature of about 225° C., held at that temperature for 8 hours, then cooled to room temperature and released from the pressure.

As another example, the thermoset resin comprises BMI and the thermoplastic resin comprises PEI. The parts are laminated against each other and heated under the pressure of about 100 psi to an intermediate temperature of about 130° to 150° C., held at that temperature for 0.5 to 10 hours, heated to the cure temperature of about 180° to 200° C. at a rate of about 2° C. per minute, held at that temperature for 6 to 8 hours, then heated to a post-cure temperature of about 220° C., held at that temperature for 8 hours, then cooled to room temperature and released from the pressure.

Most missiles and automobile composite structures would benefit from use of such integral composite structures. For example, the conversion of existing metal parts to low-cost composites on missiles would be eased by the ability to use a thermoplastic interface to existing metal parts. New designs would benefit through the use of thermoplastics by allowing easily repaired, i.e., less scrap, production composite parts to be produced.

EXAMPLE

1. Joint Configuration.

The design of a representative composite joint was made using a classical step-lap bonded joint design by combining a pseudo-isotropic thermoset laminate co-cured to a compression molded thermoplastic. In one design, the step size and spacing were set at two plies per step with the last two steps about the center-plane of the joint being only one ply per step (this was done to preclude over-stressing the adherend on thermoplastic side of the joint). The laminate ply orientation for the thermoset system was (0°/±45°/90°)sym, and remained symmetric about the center-plane through step-lap joint. Either of the two above-mentioned thermoset resin systems (BMI or cyanate ester) can be used.

2. Formation of Thermoplastic Part.

The thermoplastic material used in this joint design was formed through compression molding in a heated platen hydraulic press. Either of the two above-mentioned thermoplastic resin systems (PEI or PES) can be used, each containing either chopped fiberglass or chopped carbon fiber. The material was molded in a special matched-die tool that produces the net-formed step-lap configuration.

The platen press was heated to 560° F. (293° C.), the pressure applied to form the thermoplastic part was 600 to 800 psi (42.2 to 56.2 Kg/cm$^2$), and the molding time was approximately 5 minutes (once the tool has reached the 560° F. molding temperature). The heated platen press was then water-cooled at the maximum rate and the tool was removed from the press. The molded thermoplastic part was then extracted from the tool and then laid-up with the thermosetting BMI prepreg fabric.

3. Formation of Integral Composite Joint.

The hybrid composite joint was assembled by combining the molded polyethersulfone thermoplastic with a thermosetting graphite/BMI prepreg. The graphite/BMI prepreg was 5-harness satin-AS4/F650 fabric supplied by Hexcel (Dublin, Calif.). The completed lay-up was cured in the following cycle: Apply 100 psi (7 Kg/cm$^2$) pressure, ramp the heat 4° F./min to 300° F. (149° C.), hold at 300° F. for 1 hour, ramp the heat 4° F./min to 350° F. (177° C.) and hold to cure at 350° F. for 4 hours, post cure constrained at 450° F. (232°) for 4 to 16 hours, cool to room temperature and remove from tooling. The hybrid composite joint was complete and ready for subsequent manufacturing operations.

Testing on the hybrid composite joint during development showed the transition bonding region of the composite joint to be well within normal design strengths for a bonded joint. The BMI/PES and BMI/PEI laminate lapshear specimens had the best measurable bond strength, giving lapshear values of 2,000 to 2,400 psi (140.6 to 168.7 Kg/cm$^2$) and 1,400 to 1,600 psi (98.4 to 112.5 Kg/cm$^2$), respectively. Typically, secondarily bonded adhesive lapshear specimens have design minimums of 1,200 to 2,000 psi (84.4 to 140.6 Kg/cm$^2$) shear strength; therefore, the test specimens in this study exceeded the normal design minimums, plus, were accomplished a single co-cure operation.

The successful processing of the composite test specimens fully demonstrated the feasibility of combining a thermoset composite laminate with a thermoplastic composite in a co-cured structural element. This joining concept can be applied to making end flanges on composite missile fuselages, edge frames on composite missile access doors, and anywhere else a repairable, low-cost, robust composite joint would be desirable.

Thus, there has been disclosed an integral thermoset/ thermoplastic composite joint and method for the fabrication of same. It will be readily appreciated by those skilled in the art that various changes and modifications of an obvious nature can be made, and all such changes and modifications are considered to fall within the scope of the invention as defined by the appended claims.

What is claimed is:

1. A method for fabricating an integral thermoset/ thermoplastic composite joint comprising:
   (a) providing a first part comprising a thermoset resin and a second part comprising a thermoplastic resin, both resins being partially miscible in each other; and
   (b) forming an interface between said first and second parts by bringing said parts into mutual contact and heating said parts at a temperature and a pressure for a period of time sufficient to promote mutual miscibility prior to forming a network structure in said thermoset resin.

2. The method of claim 1 wherein said thermoset resin is selected from the group consisting of a bismaleimide and a cyanate ester.

3. The method of claim 2 wherein said thermoset resin further includes woven fibers selected from the group consisting of fiberglass and graphite.

4. The method of claim 1 wherein said thermoplastic resin is selected from the group consisting of a polyetherimide and a polyethersulfone.

5. The method of claim 4 wherein said thermoplastic resin further includes chopped fibers selected from the group consisting of fiberglass and graphite.

6. The method of claim 1 wherein said thermoset resin and said thermoplastic resin are mutually miscible within the range of about 10 to 60 percent.

7. The method of claim 1 wherein said interface is formed by:
   (a) placing both parts in a press;
   (b) applying a pressure sufficient to maintain both of said parts in mutual contact;

(c) heating said parts to a cure temperature and maintaining said parts at said cure temperature for a period of time to promote mutual solubility of said resins; and (d) cooling said parts to room temperature.

8. The method of claim 7 wherein said pressure is about 100 psi.

9. The method of claim 7 wherein said thermoplastic resin has a glass transition temperature and wherein said cure temperature does not significantly exceed said glass transition temperature.

10. The method of claim 7 wherein prior to heating said parts to said cure temperature, said parts are heated to an intermediate temperature above room temperature and below said cure temperature.

11. The method of claim 10 wherein said intermediate temperature ranges from about 100° to 150° C.

12. The method of claim 7 wherein after heating said parts to said cure temperature, said parts are further heated to a post-cure temperature for a period of time to form said network structure in said thermoset resin.

13. The method of claim 12 wherein said post-cure temperature ranges from about 175° to 250° C.

14. An integral component comprising at least one part comprising a thermoset resin joined to at least one part comprising a thermoplastic resin to form a conjoined article, said thermoset resin and said thermoplastic resin being mutually partially miscible, said conjoined article having an interface between said thermoset resin and said thermoplastic resin that evidences a gradient in resin composition.

15. The integral component of claim 14 wherein said thermoset resin is selected from the group consisting of a bismaleimide and a cyanate ester.

16. The integral component of claim 15 wherein said thermoset resin further includes woven fibers selected from the group consisting of fiberglass and graphite.

17. The integral component of claim 14 wherein said thermoplastic resin is selected from the group consisting of a polyetherimide and a polyethersulfone.

18. The integral component of claim 17 wherein said thermoplastic resin further includes chopped fibers selected from the group consisting of fiberglass and graphite.

19. The integral component of claim 14 wherein said thermoset resin and said thermoplastic resin are mutual miscible within the range of about 10 to 60 percent.

* * * * *